United States Patent [19]

Champleboux

[11] Patent Number: 4,467,835

[45] Date of Patent: Aug. 28, 1984

[54] SHUT-OFF DEVICES

[75] Inventor: Jacques Champleboux, Clermont-Ferrand, France

[73] Assignee: Caoutchouc Manufacture et Plastiques, Clermont-Ferrand, France

[21] Appl. No.: 379,876

[22] Filed: May 19, 1982

[30] Foreign Application Priority Data

May 27, 1981 [FR] France .............................. 81 10757

[51] Int. Cl.³ .......................................... F16L 55/12
[52] U.S. Cl. ........................................ 138/93; 277/34
[58] Field of Search .................... 138/90, 91, 92, 93, 138/130, 30; 134/167 C, 168 C; 220/232; 277/34, 34.3, 34.6, 227, 228, 229; 57/902; 152/349, 350, 356 R

[56] References Cited

U.S. PATENT DOCUMENTS

| | | | |
|---|---|---|---|
| 790,906 | 5/1905 | Marks | 138/130 X |
| 1,357,701 | 11/1920 | Goodall | 138/130 X |
| 3,791,898 | 2/1974 | Remi | 138/130 X |
| 4,083,384 | 4/1978 | Horne et al. | 134/167 C X |
| 4,372,562 | 2/1983 | Carter, Jr. | 277/34 |

*Primary Examiner*—Stephen Marcus
*Assistant Examiner*—Mark J. Thronson
*Attorney, Agent, or Firm*—Brisebois & Kruger

[57] ABSTRACT

A device for temporarily shutting off conduits comprises an elastic or resilient sleeve expansible under powerful internal pressure, and having a rubber wall comprising at least two superimposed plies defining an internal tube and an external sheath, the cords of all the plies being crossed from one ply to another while forming angles smaller than 30° with respect to the generatrices.

According to the invention, the pair of outer plies constitutes a resistant carcass of the sleeve while the pair of internal plies form protective plies constituted by adjacent cords having a diameter less than half that of the cords of the outer plies of the carcass and forming with the generatrices angles not greater than the angles of the cords of the carcass plies.

10 Claims, 4 Drawing Figures

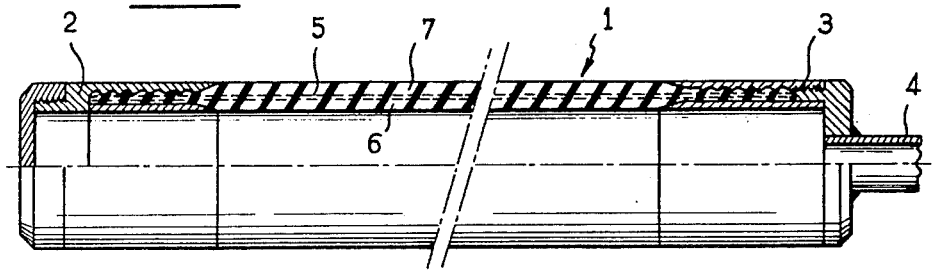
FIG_1
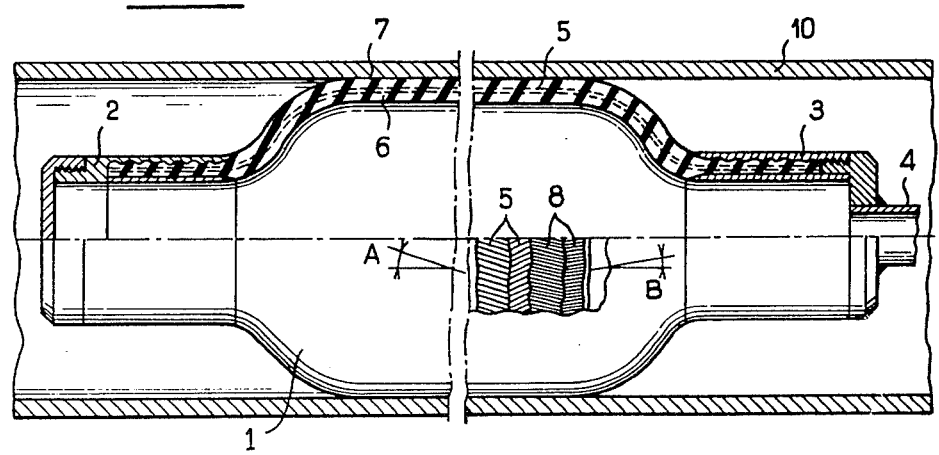
FIG_2
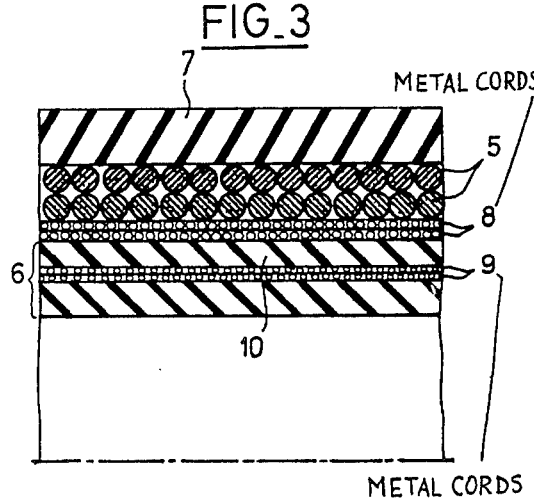
FIG_3
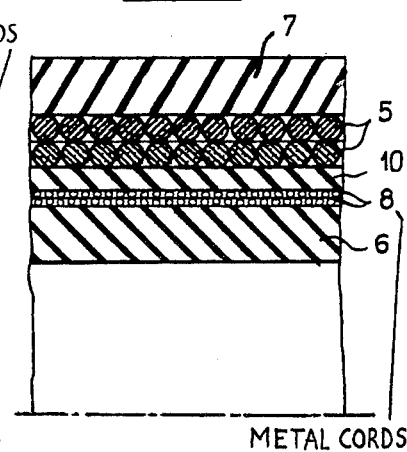
FIG_4

SHUT-OFF DEVICES

BACKGROUND OF THE INVENTION

The present invention relates to devices for temporarily shutting off conduits, of the kind comprising a flexible sleeve expansible under powerful internal pressure, having a rubber wall which is reinforced by at least two pairs of superimposed plies of cords defining an internal tube and an external sheath, the cords of all the plies being crossed from one ply to the other whilst forming angles smaller than 30° with respect to the generatrices. Hereinafter such devices will be referred to as "of the kind described". They are used inter alia for temporarily shutting off conduits which are to be repaired, bore holes or injection holes in rock.

Shut-off devices of the kind described are already known, comprising an expansible element formed by a portion of rubber tube or sleeve secured at each end to connectors of which at least one is connected to a source of pressurised liquid rendering it possible to expand the sleeve. The wall of the sleeve is reinforced by pairs of plies of metal strands crossed from one ply to another and forming with the generatrices smaller angles than the pressure balance angle which amounts to approximately 54°. These known devices are satisfactory up to already very high pressures in application, of the order of 200 to 250 bars. There are applications however which have not been implemented until now, in which it would be necessary to be able to utilise these devices at even higher pressures, for example up to 550 bars and more, to be able to balance pressures from 300 to 500 bars prevailing in particular conduits or bore holes which are to be plugged, with sufficient reliability. Since it is undesirable to multiply the number of pairs of plies of cord reinforcements at the cost of reducing the capacity of expansion of the tube, users are compelled to make use of no more than a single pair of thicker stranded cords to obtain the desirable theoretical strength. It is then observed however that with these thick cords, the rubber of the tube wall in which they are embedded is impelled into the gaps between the cords when the device is exposed to extremely high inflation pressures.

It is an object to mitigate this disadvantage.

SUMMARY OF THE INVENTION

Accordingly, in a shut-off device of the kind described, the invention consists in that outer pair of plies constitutes a resistant carcass of said sleeve whilst the pair of internal plies form protective plies constituted by adjacent cords having a diameter less than half that of the cords of said outer plies of the carcass and forming with the generatrices angles not greater than the angles of the cores of the carcass plies.

The sleeve preferably comprises a single pair of carcass plies and the protective plies are situated below the pair of carcass plies.

The invention is more particularly applicable to shut-off devices which have a comparatively high expansion ratio, of the order of 1.5 to 3 times in diameter, in such manner as to be usable in conduits or holes of a diameter varying within the region of these proportions or the internal wall of which has surface irregularities which must be matched by the flexible sleeve expanded. To obtain such expansion ratios, the cords of the resistant plies of the carcass must be laid along small angles with respect to the generatrices, that is to say angles comprised between approximately 10° and 20°. During the expansion of the sleeve under the action of the internal pressure, the angle of the resistant cords of the carcass increases towards the angle of pressure balance, whilst the cords move away from each other during their pantographic displacement. When the expansion ratio is high, this spacing of the cords of the carcass increases the risk of impelling rubber from the sleeve wall between the spaced apart cords, particularly if the device is exposed to an extremely high internal pressure. The protective plies located under the carcass reduce this disadvantage since their cords, being smaller, may be laid comparatively tightly initially, and during the expansion of the sleeve, they form a screen opposed to the upsetting of the rubber of the inner tube of the sleeve. On the other hand, being thinner than the resistant cords, the cords of the protective plies do not tend to cause a substantial reduction of the capacity of expansion of the sleeve, but it is essential for this purpose that the cords of the protective plies should be laid at angles not exceeding those of the resistant cords. It is even preferable that the cords of the protective plies be laid at slightly smaller angles than those of the resistant cords of the carcass, so that they do not impede the pantographic displacement of these latter during expansion of the sleeve. For the same purpose, it is advantageously possible to make use of elastic cords of considerable elongation, for example having an elongation at breaking point of the order of 3 to 10%, for the protective plies. In this case, the cords of the protective plies may be laid very closely initially to form an effective screen even at high expansion ratios, without impeding the expansion of the sleeve by their elastic elongation.

BRIEF DESCRIPTION OF THE DRAWINGS

In order that the invention may be more clearly understood, reference will now be made to the accompanying drawings, which show some embodiments thereof by way of example and in which:

FIG. 1 shows a first embodiment of shut-off device in the free state in half axial section.

FIG. 2 shows the device of FIG. 1 in the expanded state, within a conduit,

FIG. 3 is an axial section through a second embodiment of the sleeve wall to an enlarged scale, and FIG. 4 shows a view similar to that of FIG. 3 of a third embodiment.

DETAILED DESCRIPTION OF PREFERRED EMBODIMENTS

Referring now to the drawings the device illustrated essentially comprises an expansible element 1 formed by a portion of flexible tube of sleeve secured at each extremity to connectors or plugs 2, 3 of which at least one comprises an inlet 4 for liquid under pressure.

The connectors are preferably cylindrical connectors the diameters of which do not exceed the initial diameter of the unexpanded sleeve, in such manner as to allow for insertion of the device into conduits 10 or holes of a diameter but little greater than that of the sleeve 1, the device then being usable with a small expansion although it is under very high pressure, to apply the same forcibly against the wall of the conduit.

The rubber wall of the sleeve 1 is reinforced in known manner by a reinforcement resistant to pressure, formed by a pair of plies 5 of resistant cords laid in a helical pattern and crossing each other from one ply to the other at an angle A distinctly smaller than the angle of balance (approximately 54°) and which in practice is comprised between 10° and 20° if it is wished to obtain an expansion ratio of at least 3 times the diameter in the free state for the sleeve 1. This resistant reinforcement 5 is embedded approximately in the middle of the thickness of the sleeve wall and within this wall it defines an internal tube 6 having as its essential function to assure sealing, and an external sheath 7 intended to be applied against the internal surface of the conduit 10 or of the bore hole.

As already stated in the foregoing, this device may be utilised in conduits or bore holes having a diameter comprised between the minimum initial diameter of the device and the maximum diameter in the expanded state of the sleeve 1 under pressure, so that it is advantageous for the sleeve to have an expansion ratio which is as high as possible. Furthermore, it is attempted to secure as high as possible a resistance to internal pressure, in such manner as to be able to balance extremely high pressures liable to be reached in particular conduits or bore holes. This leads to making use—for the reinforcement 5—of a single pair of plies of cords which are very resistant i.e. strong, and consequently of large diameter, whilst leaving between these plies—whilst being installed at the initial diameter of the sleeve—a sufficient spacing to allow of the pantographic deformation of the cords of the plies during expansion.

In accordance with the invention, at least one pair of protective plies 8 formed by cords which are distinctly thinner and more closely set to each other, is situated immediately below the carcass reinforcement 5.

The cords of these plies 8 are laid in helical fashion and cross each other from one ply to the other, being directed along an angle B not greater than that of the resistant cords 5 and preferably smaller by 2° to 10° than the same. The protective plies are applied one over another and the assembly bears closely on the internal ply of the resistant reinforcement 5, in such manner as to form a screen effectively opposing the flow of the rubber of the tube 6 between the thick cords of the reinforcement 5.

In another embodiment illustrated in FIG. 3, another pair of protective plies 9 formed by thin cords is placed within the thickness of the tube 6, that is to say at some distance from the first pair 8 from which it is separated by an intermediate rubber layer 10. This second pair of protective plies enhances the barrier effect opposed to the flow of the rubber 6, but due to its radial spacing from the pair of plies 8, it causes a lesser reduction of the capacity of expansion of the tube 1. The thickness of the rubber layer 10 may be of the order of the thickness of the pairs of protective plies 8 or 9.

In another embodiment illustrated in FIG. 4, the sleeve 1 comprises only a single pair of protective plies 8 of small diameter cords and this pair of plies 8 is spaced radially from the carcass 5 by an intermediate layer 10 of rubber having approximately the same thickness as the pair of plies 8.

The examples illustrated are applicable more especially in the case of shut-off plugs having an expansion ratio of 3 times the initial diameter of the device and capable of bearing an internal operating pressure of the order of 550 bars (with a test pressure of 800 bars) in such manner as to be usable for balancing with adequate safety of pressures of the order of 500 bars which may prevail in particular conduits or bore holes. Thus, for a plug which in the free state has an outer diameter of 170 mm and an inner diameter of 90 mm, the resistant reinforcement of the carcass 5 is formed by a pair of plies of metal cords of a diameter of approximately 5 mm, laid along an angle A comprised between 8° and 20°, with respect to the generatrices. The protective plies 9 (or 8 and 9), are formed by metal cords of a diameter of approximately 1.5 mm in diameter laid along an angle B of 6° to 15° with respect to the generatrices (and smaller by 2° to 10° than the angle of the strong cords 5). The inner tube section 6 and the outer sheath 7 have a thickness of at least 5 mm.

For fitting to the connectors 2, 3, the sheathing 7 is stripped off at the ends of the sleeve in such manner as to bare the top layer of the reinforcement 5 along a distance equal to the depth of insertion of the connectors. These connectors are consequently joined directly to the resistant reinforcement 5 and their external diameter is not appreciably greater than that of the sleeve 1. The connectors 2, 3 may be replaced by connectors or plugs of a different kind from those illustrated.

I claim:

1. A device for temporarily shutting off conduits comprising
   (a) a flexible cylindrical sleeve expansible under powerful internal pressure,
   (b) closure plugs secured in opposite ends of said sleeve, one of said plugs being imperforate and the other plug having an inlet for liquid under pressure,
   (c) said sleeve having a rubber wall which is reinforced by a pair of superimposed reinforcing plies of cords embedded therein and defining an internal rubber tube and an external rubber sheath,
   (d) the cords of said reinforcing plies being secured at opposite ends to the said closure plugs respectively and being crossed from one ply to the other at symmetrical angles smaller than 30° with respect to the longitudinal axis of the cylindrical sleeve
   (e) said reinforcing plies constituting a resistant carcass of said sleeve of which adjacent cords of the respective plies move apart with expansion of the sleeve under the powerful internal pressure,
   (f) means inhibiting the rubber of the internal rubber tube from being impelled into the interstices between the cords of the reinforcing plies when moved-apart by the powerful internal pressure said means comprising a pair of superimposed protective plies of cords embedded within the rubber wall of the sleeve internally of and adjacent said reinforcing plies,
   (g) the cords of said protective plies each having a diameter of less than half that of the cords of the reinforcing plies, lying closely adjacent one another, and being crossed from one ply to the other at symmetrical angles to the longitudinal axis of the cylindrical sleeve not greater than the said angles at which the cords of the reinforcing plies are crossed.

2. A device according to claim 1, wherein the pair of protective plies is situated directly below the pair of reinforcing plies.

3. A device according to claim 1, in which the pair of protective plies is located radially within the reinforcing plies by an intermediate layer of rubber having approximately the same thickness as the pair of protective plies.

4. A device according to claim 1, and comprising two pairs of adjacent protective plies located radially within the reinforcing plies, one of said pairs of protective plies being situated directly below the pair of reinforcing plies and the other of said pairs of protective plies being spaced radially therefrom by an intermediate layer of rubber.

5. A device according to claim 1, wherein the cords of the protective plies are crossed from one ply to the other, and directed along angles which are symmetrical and smaller by 2° to 10° than the angles of the cords forming the reinforcing plies.

6. A device according to claim 1, wherein the cords of the protective plies are cords of considerable elastic elongation, their elongation at breaking point being of the order of 3 to 10%.

7. A device for temporarily shutting off conduits comprising (a) a flexible cylindrical sleeve expansible under powerful internal pressure, (b) closure plugs secured in opposite ends of said sleeve, one of said plugs being imperforate and the other plug having an inlet for liquid under pressure, (c) said sleeve having a rubber wall which is reinforced by a pair of superimposed reinforcing plies of cords embedded therein and defining an internal rubber tube and an external rubber sheath, (d) the cords of said reinforcing plies being secured at opposite ends to the said closure plugs respectively and being crossed from one ply to the other at symmetrical angles comprised between 8° and 20° with respect to the longitudinal axis of the cylindrical sleeve (e) said reinforcing plies constituting a resistant carcass of said sleeve of which adjacent cords of the respective plies move apart with expansion of the sleeve under the powerful internal pressure, (f) means inhibiting the rubber of the internal rubber tube from being impelled into the interstices between the cords of the reinforcing plies when moved-apart by the powerful internal pressure, said means comprising a pair of superimposed protective plies of cords embedded within the rubber wall of the sleeve internally of and adjacent said reinforcing plies, (g) the cords of said protective plies each having a diameter of less than half that of the cords of the reinforcing plies, lying closely adjacent one another, and being crossed from one ply to the other at symmetrical angles which are comprised between 6° and 15° to the longitudinal axis of the cylindrical sleeve but which are smaller by 2° to 10° than the said angles at which the cords of the reinforcing plies are crossed.

8. A device according to claim 7 and having an expansion ratio comprised between 1.5 and 3 and wherein the wall of said flexible sleeve is reinforced by a single pair of reinforcing plies of cords having a diameter of at least 4 mm, said pair of reinforcing plies defining within the wall an outer sheath and an internal tube of rubber having a thickness of at least 5 mm, and said pair of protective plies is formed by cords having a diameter comprised between 1 and 2 mm.

9. A device according to claim 7 in which the cords of the resistant plies are metal cords.

10. A device according to claim 7, in which the cords of the protective plies are metal cords.

* * * * *